April 13, 1926.  
R. E. RAMBO  
1,580,530  
DETACHABLE COLLECTOR RINGS  
Filed July 11, 1924  3 Sheets-Sheet 1

WITNESSES:  
J. H. Voelker  
O. B. Buchanan

INVENTOR  
Rawdon Evans Rambo.  
BY  
Wesley G. Carr  
ATTORNEY

April 13, 1926.

R. E. RAMBO 1,580,530

DETACHABLE COLLECTOR RINGS

Filed July 11, 1924

WITNESSES:

INVENTOR
Rawdon Evans Rambo.
BY
*Wesley G. Carr*
ATTORNEY

April 13, 1926.  
R. E. RAMBO  
1,580,530

DETACHABLE COLLECTOR RINGS

Filed July 11, 1924 3 Sheets-Sheet 3

WITNESSES:
S. H. Voelker
O. B. Buchanan

INVENTOR
Rawdon Evans Rambo.
BY
Wesley G. Carr
ATTORNEY

Patented Apr. 13, 1926.

1,580,530

UNITED STATES PATENT OFFICE.

RAWDON E. RAMBO, OF WILKINSBURG, PENNSYLVANIA, ASSIGNOR TO WESTINGHOUSE ELECTRIC & MANUFACTURING COMPANY, A CORPORATION OF PENNSYLVANIA.

DETACHABLE COLLECTOR RINGS.

Application filed July 11, 1924. Serial No. 725,412.

*To all whom it may concern:*

Be it known that I, RAWDON E. RAMBO, a citizen of the United States, and a resident of Wilkinsburg, in the county of Allegheny and State of Pennsylvania, have invented a new and useful Improvement in Detachable Collector Rings, of which the following is a specification.

My invention relates to collector rings for electric machines and it relates more specifically to slip rings of the shrunk-on type mounted on a detachable supporting member and particularly adapted for railway motor service.

It has been found desirable in railway service to employ collector rings of pure copper, owing to difficulties encountered with the brush-contacting surface when other materials are utilized. The use of copper has the disadvantage, however, that the copper has a relatively high coefficient of heat expansion and a low coefficient of elasticity, so that as it expands and contracts in use, it has a very strong tendency to permanently increase its diameter and to pull away from any support of the usual type. There has been developed, therefore, a mounting arrangement wherein the slip rings are shrunk onto a mica wrapping surrounding a suitable hub member, and the slip rings are provided with annular flanges on their inner peripheries which are, in turn, gripped by a shrink-ring of steel or other material having a smaller coefficient of expansion than the collector ring. Thus, the more the collector ring expands the tighter it is gripped by the shrink-ring. This type of construction is shown and described in the patent of Siegfried & Jungk, 1,281,862, granted October 15, 1918, and assigned to the Westinghouse Electric & Mfg. Co.

When shrunk-on copper rings are utilized as above described, the parts are not only very hard to assemble but it becomes practically impossible to disassemble the parts in order to repair a lead or collector ring which may have become damaged.

It is an object of my invention to avoid the necessity for the disassembling of the entire group of slip rings and supporting parts, which frequently includes the entire rotor, and sending the same back to the factory for repair, frequently resulting in long delays and considerable expense, and at the same time it is my object to preserve the advantages of the shrunk-on rings of the type shown in said Siegfried & Jungk patent.

With the aforementioned general object in view, I provide a construction wherein each slip ring is shrunk onto a separate annular supporting member which is, in turn, carried by a supporting hub on the shaft of the rotor member. The supporting members and the hub are preferably made of the same material, such as steel, whereby a metal-to-metal contact is provided which avoids difficulties owing to any inequalities in expansion or in the elastic qualities of the adjoining parts.

Other details of my invention relate to the utilization of conical contacting surfaces in the detachable joints, and annularly disposed lugs and recesses on the cooperating detachable parts whereby all of the slip-ring supporting members may be removed by rotating the same through a small angle sufficient to permit the annularly disposed lugs of the supporting member to pass by the annularly projecting lugs of the hub portion.

Figure 1:
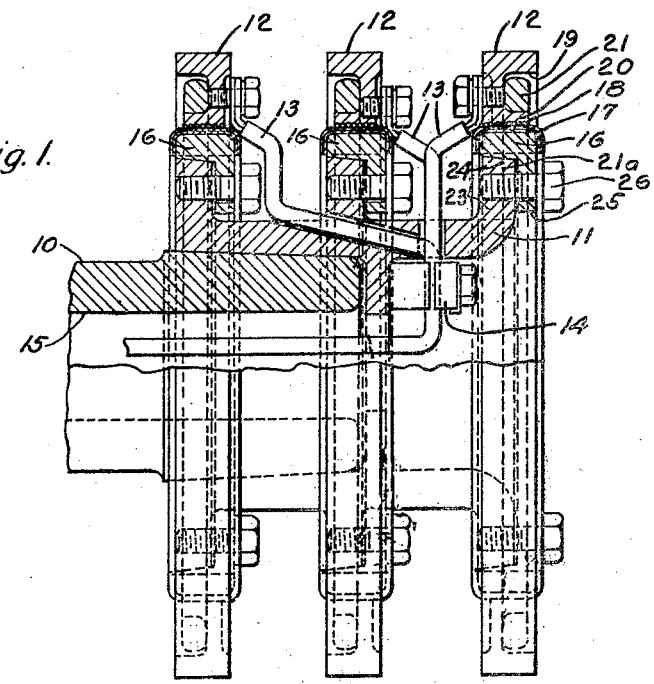
Figure 1 is a side view, partly in longitudinal section, showing my invention in a preferred form.

The railway motor or other electric machine to which my invention is applied, comprises a rotor member, a portion of which is shown at 10, which may carry a hub member 11 suitably secured thereto as by means of a conical joint. The plurality of slip rings 12, which are preferably copper as hereinbefore mentioned, are suitably mounted upon the hub member 11 by means which will be presently described, and are connected to the windings on the rotor of the electric machine through suitable leads 13, which may be supported from the hub member 11 by means of a clip 14 and which may extend through a longitudinal opening 15 in the shaft of the rotor or may be otherwise arranged to complete the electrical circuits in a well understood manner.

The slip rings 12 are of the shrunk-on type described in the Siegfried & Jungk patent, except that each slip ring has a separate annular supporting member 16 which is preferably made of steel and which is surrounded by a layer 17 of insulating material, such as mica, which may, in turn, be held by band wires 18 around which the slip rings are disposed with a close fit such as is obtained by shrinking the rings onto the band wires. The slip rings 12 are provided with annular recesses 19 to provide annular base flanges 20 which are gripped by shrink-rings 21 of steel or other suitable material as described in the above-mentioned patent.

Figure 2:
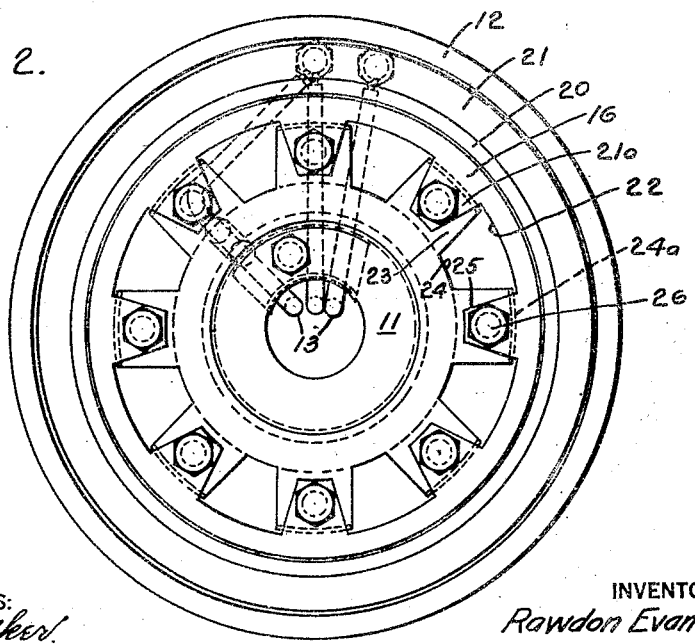
Fig. 2 is an end view thereof.
Figure 3:
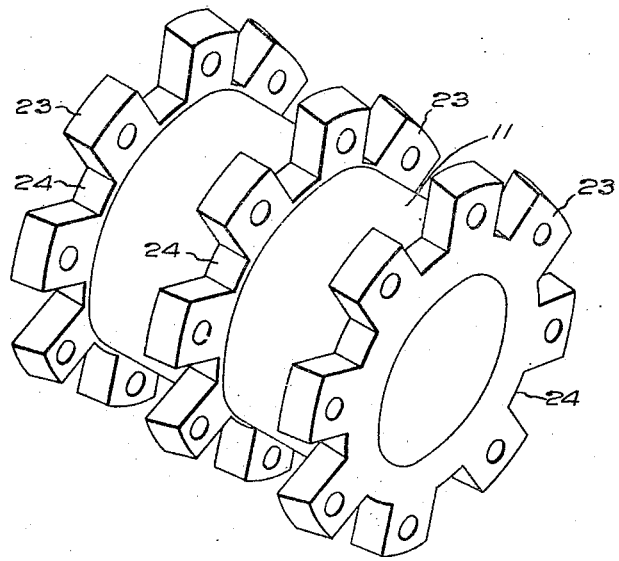
Figs. 3 and 4 are perspective detail views showing the hub member and annular slip ring supporting members, respectively.
Figure 4:
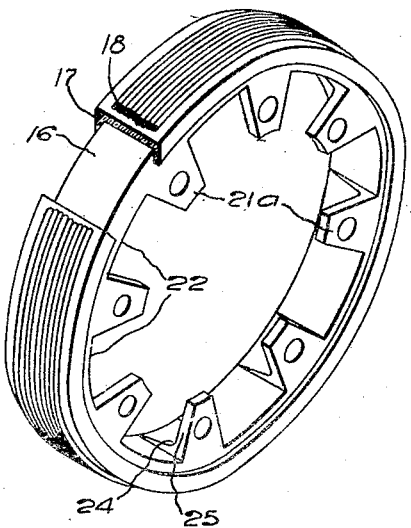

Each slip ring 12 with its associated supporting member 16 forms a permanently connected unit which may be detachably mounted on the hub member 11. In the preferred form of my invention as shown in Figs. 1 and 2, all of the supporting members 16 are of like size and configuration and are provided with annularly disposed, inwardly directed lugs 21ᵃ and recesses 22 corresponding to outwardly directed lugs 23 and recesses 24 of the hub member 11. The outer periphery of the lugs 23 of the hub member are provided with conical surfaces, and the lugs 21ᵃ of the slip-ring supporting members 16 are provided with cut-away portions forming a conical shoulder 24ᵃ and inwardly-extending overhanging flange 25. The shoulders 24ᵃ of the lugs 21ᵃ coact with the conical peripheral surfaces of the lugs 23, and the inwardly-extending flanges 25 are perforated to receive nuts 26 which are threaded into the lugs 23 of the hub member to detachably secure the supporting members 16 on the hub member 11. It will be understood that the hub member is provided with as many rings of alternating lugs 23 and recesses 24 as there are slip rings to be supported.

To assemble the slip rings, which have been previously shrunk onto their respective supporting members 16, the particular supporting member which is to be mounted the farthest from the end of the shaft or hub member 11 is first moved into place by causing the lugs 21ᵃ of the supporting member 16 to pass through the recesses 24 of all of the rings of lugs and recesses on the hub member except the last, whereupon the supporting member 16 is rotated slightly to bring its lugs into engagement with the lugs 23. The retaining bolts 26 and conductor 13 may then be applied. The remaining slip rings are applied in a similar manner. In case of damage to any slip ring or lead, the parts may be disassembled and the damaged member replaced with a minimum of expense and delay.

Figure 5:
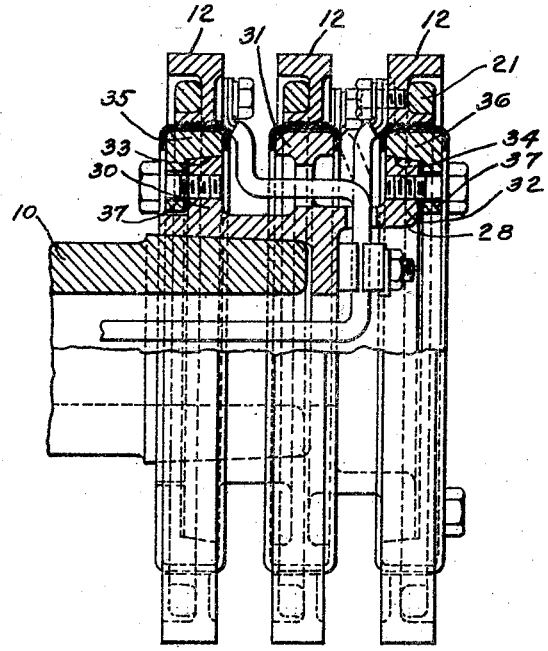
Fig. 5 is a view similar to Fig. 1 showing a modification.
Figure 6:
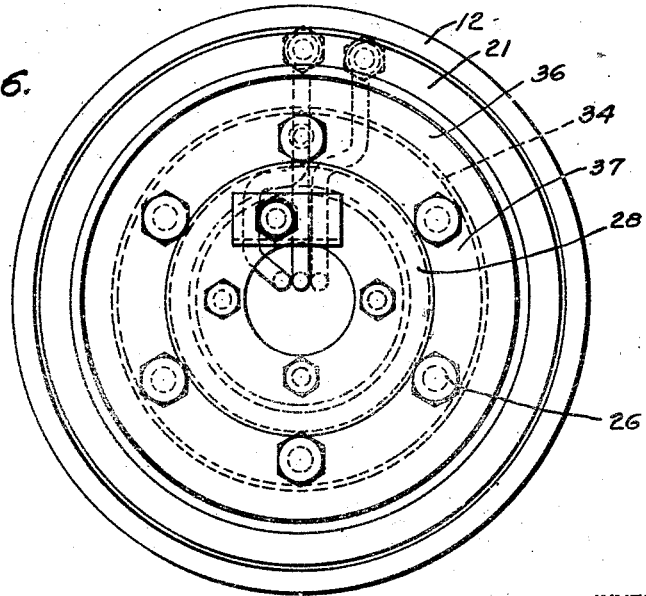
Fig. 6 is an end view of the structure shown in Fig. 5.

In order to illustrate the fact that my invention is not limited in every respect to the precise form or embodiment shown in Figs. 1 and 2, although such embodiment at present appears to be the preferred construction, I have shown a somewhat modified construction in Figs. 5 and 6, wherein the annularly disposed lugs and recesses of the first construction are avoided. In the embodiment shown in Figs. 5 and 6, the hub member 28 is provided with three annularly disposed extensions 30, 31 and 32, corresponding to the number of slip rings utilized in this particular installation. The central annular member 31 is the larger and constitutes the supporting member for the center slip ring 12 which is permanently shrunk onto the same as described hereinabove and in the aforementioned Siegfried & Jungk patent. The inner lug 30 and the outer lug 32 are provided with inwardly and outwardly inclined conical surfaces 33 and 34, respectively, which cooperate with similar surfaces on the inner peripheries of the supporting members 35 and 36 of the inner and outer slip rings, respectively.

The supporting members 35 and 36 are provided with overhanging annular flanges 37 which are bolted to the annular extensions 30 and 32, respectively, of the hub member.

To assemble the structure shown in Figs. 5 and 6, the central slip ring 12 is first permanently shrunk onto its annular supporting member 31 which is integral with the hub member 28. The inner slip ring with its permanently connected supporting member 35 is next attached to the detachable hub member 28, before the latter is applied to the rotor member. The hub member 28 is then applied to the shaft of the rotor member 10, and the last remaining slip ring may be applied by securing its supporting member 36 to the annular flange extension 32 of the hub member 28.

While I have described my invention in two preferred forms, it is obvious that many changes may be made in details of construction and embodiment thereof without departing from the spirit and scope of my invention, and I desire that the appended claims be construed to embrace the full range of equivalents commensurate with the scope of my invention.

I claim as my invention:

1. The combination with an electric machine having a rotor member, of a plurality of slip-rings operatively associated with said rotor member, a separate supporting member for each slip-ring, a substantially non-separable connection between each slip-ring and its supporting member, and means for detachably securing each supporting member to said rotor member.

2. The combination with an electric machine having a rotor member, of a plurality of slip-rings operatively associated with said rotor member, a separate metallic supporting member for each slip-ring, a substantially non-separable insulating connection between each slip-ring and its supporting member, and means for detachably securing each supporting member to said rotor member.

3. The combination with an electric machine having a rotor member, of a plurality of slip-rings operatively associated with said rotor member, a separate metallic supporting member for each slip-ring, a substantially non-separable insulating connection between each slip-ring and its supporting member, and means for providing a detachable metal-to-metal connection between each supporting member and a member secured to said rotor member.

4. The combination with an electric machine having a rotor member, of a plurality of slip-rings operatively associated with said rotor member, a separate metallic supporting member for each slip-ring, a substantially non-separable insulating connection between each slip-ring and its supporting member, and means for providing a detachable metal-to-metal connection between each supporting member and a member secured to said rotor member, said metal-to-metal connection including contacting conical surfaces.

5. The combination with an electric machine having a rotor member, of a plurality of slip-rings operatively associated with said rotor member, a separate metallic supporting member for each slip-ring, a substantially non-separable insulating connection between each slip-ring and its supporting member, and means for providing a detachable metal-to-metal connection between each supporting member and a member secured to said rotor member, said metal-to-metal connection including contacting conical surfaces of materials having similar expansion characteristics.

6. The combination with an electric machine having a rotor member, of a plurality of slip-rings operatively associated with said rotor member, a separate metallic supporting member for each slip-ring, a substantially non-separable insulating connection between each slip-ring and its supporting member, and means for providing a detachable metal-to-metal connection between each supporting member and a member secured to said rotor member, one or more of said metal-to-metal connections being between elements comprising a plurality of annularly disposed lugs and recesses, whereby the lugs may be engaged in one angular position of the slip-ring supporting member and may be disposed opposite recesses to permit removal in another angular position of the slip-ring supporting member.

7. The combination with an electric machine having a rotor member, of a plurality of slip-rings operatively associated with said rotor member, a separate metallic supporting member for each slip-ring, a substantially non-separable insulating connection between each slip-ring and its supporting member, and means for providing a detachable metal-to-metal connection between each supporting member and a member secured to said rotor member, one or more of said metal-to-metal connections being between elements comprising a plurality of annularly disposed lugs and recesses, whereby the lugs may be engaged in one angular position of the slip-ring supporting member and may be disposed opposite recesses to permit removal in another angular position of the slip-ring supporting member, said lugs having contacting conical surfaces.

8. The combination with an electric machine having a rotor member, of a plurality of copper slip-rings operatively associated with said rotor member, a separate supporting member for each slip-ring, insulating layers surrounding said supporting members, said slip-rings being tightly fitted over said insulating layers, and means for detachably securing each supporting member to a hub member carried by said rotor member, the contacting surfaces of said supporting members and rotor member being of metal having a higher degree of elasticity than copper.

9. The combination with an electric machine having a rotor member, of a plurality of copper slip-rings operatively associated with said rotor member, a separate supporting member for each slip-ring, insulating layers surrounding said supporting members, said slip-rings being tightly fitted over said insulating layers, means for detachably securing each supporting member to a hub member carried by said rotor member, said slip-rings having annular flanges at their inner peripheries, and retaining rings tightly fitting said flanges and having a smaller coefficient of expansion than copper.

In testimony whereof, I have hereunto subscribed my name this 8th day of July 1924.

RAWDON E. RAMBO.